United States Patent
Mita

(10) Patent No.: US 7,336,865 B2
(45) Date of Patent: Feb. 26, 2008

(54) OPTICAL SWITCH

(75) Inventor: Masahiro Mita, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 238 days.

(21) Appl. No.: 10/547,391

(22) PCT Filed: Dec. 20, 2004

(86) PCT No.: PCT/JP2004/019046

§ 371 (c)(1),
(2), (4) Date: Aug. 31, 2005

(87) PCT Pub. No.: WO2005/059623

PCT Pub. Date: Jun. 30, 2005

(65) Prior Publication Data

US 2006/0165347 A1 Jul. 27, 2006

(30) Foreign Application Priority Data

Dec. 19, 2003 (JP) .............................. 2003-422686
Jan. 19, 2004 (JP) .............................. 2004-009955

(51) Int. Cl.
*G02B 6/12* (2006.01)
(52) U.S. Cl. ......................... 385/16; 385/19; 385/22; 385/23
(58) Field of Classification Search ..................... None
See application file for complete search history.

(56) References Cited

U.S. PATENT DOCUMENTS 5,905,829 A    5/1999   Maenishi et al.
6,169,826 B1 *  1/2001  Nishiyama et al. ............ 385/22
6,807,331 B2 * 10/2004  Hsu et al. ....................... 385/16
2003/0133648 A1  7/2003  Mitsuoka et al.

FOREIGN PATENT DOCUMENTS

| JP | 3-140913 A | 6/1991 |
|---|---|---|
| JP | 6-75177 A | 3/1994 |
| JP | 11-119125 A | 4/1999 |
| JP | 2000-34711 A | 12/2000 |
| JP | 2001-4935 A | 1/2001 |

* cited by examiner

*Primary Examiner*—Sung Pak
*Assistant Examiner*—Chad H. Smith
(74) *Attorney, Agent, or Firm*—Sughrue Mion, PLLC

(57) ABSTRACT

An optical switch for switching the connection of one or more movable optical fibers to one or more stationary optical fibers, comprising a movable soft magnetic block connected to an end portion of each movable optical fiber, a stationary soft magnetic block connected to each stationary optical fiber and fixed at a position opposing the movable block, an actuator for moving the movable block relative to the stationary block, and a means for positioning the movable block relative to the stationary block; the actuator comprising a yoke having a base portion and a pair of arms extending from both ends of the base portion such that they sandwich the movable block in its moving direction, a permanent magnet attached to the base portion of the yoke, and a coil mounted to at least one arm; and regardless of the position of the movable block, a magnetic flux generated by the permanent magnet being more in a first gap between one arm and the movable block than in a second gap between the other arm and the movable block.

17 Claims, 12 Drawing Sheets

OPTICAL SWITCH

FIELD OF THE INVENTION

The present invention relates to an optical switch, particularly to an optical switch suitable for optical communications apparatuses, light transmission apparatuses, etc.

BACKGROUND OF THE INVENTION

Advancing optical communications have made optical fiber communications networks have long optical paths and complicated branches. Accordingly, the switching of optical fiber paths (transmission paths) between telecommunications circuits has increased in optical communications apparatuses and light transmission apparatuses, resulting in using many optical switches. The purposes of switching optical paths are not only to switch usual telecommunications circuits, but also to recover from troubles by switching a broken transmission path to another normal path, to conduct the maintenance of the switching of optical telecommunications network lines in buildings and areas, to change optical paths in measuring apparatuses, etc. With respect to the branching number of optical paths, there are a 1×2 optical switch for switching one movable optical fiber to two stationary optical fibers, a 1×m or n×m optical switch in which ends of many optical fibers are abutting, etc.

With respect to the switching systems of optical switches, there are a system of switching light-proceeding directions by electrically or optically changing the refractive index or phase of optical paths, a system of switching light-proceeding directions by mechanically moving optical paths, etc. Among them, mechano-optical switches are advantageous in that they suffer little coupling loss of light and have little dependency on the wavelength of transmitted light. Accordingly, proposals have been made to provide mechano-optical switches having various structures depending on various switching purposes and branching numbers.

For instance, a mechano-optical switch described in U.S. Pat. No. 6,169,826 comprises, as shown in FIG. 11, a movable member 30 made of a soft magnetic ceramic, to which end portions of two movable optical fibers 20a, 20b are fixed, a stationary member 32 fixed at a position opposing the movable member 30, four stationary optical fibers 21a, 21b, 21c, 21d fixed to the stationary member 32, an actuator for moving the movable member 30 relative to the stationary member 32, and a means for positioning the movable optical fibers 20a, 20b relative to the stationary optical fibers 21a, 21b, 21c, 21d, the actuator comprising a permanent magnet 52, first and second yokes 50a, 50b opposing each other such that they sandwich the movable member 30 in its moving direction, and coils 51a, 51b mounted to the first and second yokes 50a, 50b. This small, high-reliability mechano-optical switch is now widely used.

Optical telecommunications networks are classified to telecommunications networks of analog lines (called "telecommunications lines") including long-distance communications between cities, and closed telecommunications networks in companies, etc. [generally called "local area networks (LAN)"]. Some telecommunications networks of analog lines have optical fibers for redundant circuits to minimize troubles by the disruption of optical fibers, with many optical switches used for switching between these optical fibers for redundant circuits. Optical switches for this purpose have a self-holding mechanism consuming electric power only during switching but needing no electric power when optical fibers are coupled. Described in U.S. Pat. No. 6,169,826 as an optical switch suitable for such applications is a latching optical switch comprising movable optical fibers which are moved by energizing coils and held at that position by a permanent magnet.

The LAN-type optical telecommunications network has a closed light loop as a whole, with optical fibers connected by terminal devices on the loop. Introduced light signals are once converted to electric signals, and electric signals passing through copper lines from the terminal devices are subjected to necessary treatments for transmitting to or receiving from a LAN, converted to light signals and then return to the loop. Though there is no problem in this telecommunications network as long as each terminal works normally, the failure of one terminal stops light signals from being sent, resulting in the breakdown of the entire telecommunications network. To prevent this problem, an optical switch for cutting the failed terminal away from the light loop at the time of abnormality should be provided. In this case, a non-latching optical switch in which movable optical fibers automatically return to a predetermined "home position" when a normal electric signal is stopped is more preferable than the above latching optical switch in which movable optical fibers are kept at a holding position. Though the optical switch described in U.S. Pat. No. 6,169,826 has a small, high-reliability structure using an electromagnetic force for switching operation, it is not a non-latching type. It may be contemplated to use a spring force for returning without electric power, but the structure of the electromagnetically operated optical switch described in U.S. Pat. No. 6,169,826 would become complicated if a spring mechanism is added thereto.

OBJECT OF THE INVENTION

Accordingly, an object of the present invention is to provide a small, high-reliability, non-latching optical switch having movable optical fibers that can move to a home position at the time of abnormality.

DISCLOSURE OF THE INVENTION

The optical switch for switching the connection of one or more movable optical fibers to one or more stationary optical fibers according to an embodiment of the present invention comprises a movable soft magnetic block connected to an end portion of each movable optical fiber, a stationary soft magnetic block connected to each stationary optical fiber and fixed at a position opposing the movable block, an actuator for moving the movable block relative to the stationary block, and a means for positioning the movable block relative to the stationary block; the actuator comprising a yoke having a base portion and a pair of arms extending from both ends of the base portion such that they sandwich the movable block in its moving direction, a permanent magnet attached to the base portion of the yoke, and a coil mounted to at least one arm; and regardless of the position of the movable block, a magnetic flux generated by the permanent magnet being more in a first gap between one arm and the movable block than in a second gap between the other arm and the movable block.

The first and second gaps preferably have different widths in the moving direction of the movable block.

The optical switch for switching the connection of one or more movable optical fibers to one or more stationary optical fibers according to another embodiment of the present invention comprises a movable soft magnetic block connected to an end portion of each movable optical fiber, a stationary soft magnetic block connected to each stationary optical fiber and fixed at a position opposing the movable block, an actuator for moving the movable block relative to the stationary block, and a means for positioning the movable block relative to the stationary block; the actuator comprising a yoke having a base portion and a pair of arms extending from both ends of the base portion such that they sandwich the movable block in its moving direction, a permanent magnet fixed between the stationary block and the yoke, and one or more coils mounted to the yoke; the movable block moving between a home position closest to one arm and a make position closest to the other arm; the width (a+s) of the first gap being smaller than the width (b−s) of the second gap at the make position, wherein a represents the width of the first gap between the movable block and the one arm at the home position, b represents the width of the second gap between the movable block and the other arm at the home position, and s represents the moving distance of the movable block.

The difference (b−a−2s) between the width (a+s) of the first gap and the width (b−s) of the second gap is preferably 0.3 mm or more at the make position.

The optical switch for switching the connection of one or more movable optical fibers to one or more stationary optical fibers according to a further embodiment of the present invention comprises a movable soft magnetic block connected to an end portion of each movable optical fiber, a stationary soft magnetic block connected to each stationary optical fiber and fixed at a position opposing the movable block, an actuator for moving the movable block relative to the stationary block, and a means for positioning the movable block relative to the stationary block; the actuator comprising a yoke having a base portion and a pair of arms extending from both ends of the base portion such that they sandwich the movable block in its moving direction, a permanent magnet attached to the yoke, and a coil mounted to at least one arm; and the permanent magnet being positioned away from a longitudinal center line extending between the pair of arms.

With the above structure, a magnetic flux generated by the permanent magnet flows through a first magnetic flux path from the permanent magnet to the stationary block, to the movable block, to the first gap and to the one arm, and a second magnetic flux path from the permanent magnet to the other arm, to the second gap, to the movable block, to the first gap and to the one arm. Accordingly, the magnetic flux from the permanent magnet is always more in the first gap than in the second gap.

The movable block moves between a home position closest to one arm and a make position closest to the other arm. When the coil is energized to generate a magnetic flux, the total magnetic flux is less in a first gap between the movable block and one arm than in a second gap between the movable block and the other arm, so that the movable block is held at the make position. When the coil becomes inactive, the movable block returns to the home position.

A setback distance δ expressed by δ=(b−s)−a is preferably more than 0, wherein a and b respectively represent the widths of the first and second gaps at the home position, and s represents the moving distance of the movable block. This optical switch has higher reliability in automatic returning to a home position than the optical switch meeting the relation of b=(a+s).

The coil is preferably mounted to each arm of the yoke.

At least one of the movable block and the stationary block is preferably made of a soft magnetic ceramic. The soft magnetic ceramic is preferably a soft magnetic ferrite, more preferably manganese-zinc ferrite. When a single crystal ferrite is used as the soft magnetic ferrite, working precision is easily improved.

The optical switch preferably comprises pluralities of movable optical fibers and/or stationary optical fibers.

BRIEF DESCRIPTION OF THE DRAWINGS

FIG. 1(*b*) is an exploded view showing an important portion of the optical switch of FIG. 1(*a*);

FIG. 1(*c*) is a cross-sectional view taken along the line C-C in FIG. 1(*b*);

FIG. 2(*b*) is an enlarged cross-sectional view taken along the line B-B in FIG. 1(*a*);

FIG. 3(*b*) is a schematic view showing the magnetic flux of a permanent magnet and the magnetic flux of coils when the movable block is being changed from the home position to a make position in the optical switch of FIG. 1(*a*);

FIG. 3(*c*) is a schematic view showing the distance between a movable block and a tip yoke member when the movable block is held at a make position in the optical switch of FIG. 1(*a*);

FIG. 7(*b*) is a schematic view showing the magnetic fluxes of a permanent magnet and coils when a movable block is moving from a home position to a make position in the optical switch of FIG. 6;

FIG. 7(*c*) is a schematic view showing the distance between a movable block and a tip yoke member when the movable block is held at a make position in the optical switch of FIG. 6;

FIG. 9(*b*) is a schematic view showing the magnetic fluxes of a permanent magnet and coils when a movable block is moving from a home position to a make position in the optical switch of FIG. 8;

FIG. 9(*c*) is a schematic view showing the distance between a movable block and a tip yoke member when the movable block is held at a make position in the optical switch of FIG. 8;

DESCRIPTION OF THE PREFERRED EMBODIMENTS

[I] First Embodiment

Figure 1A:
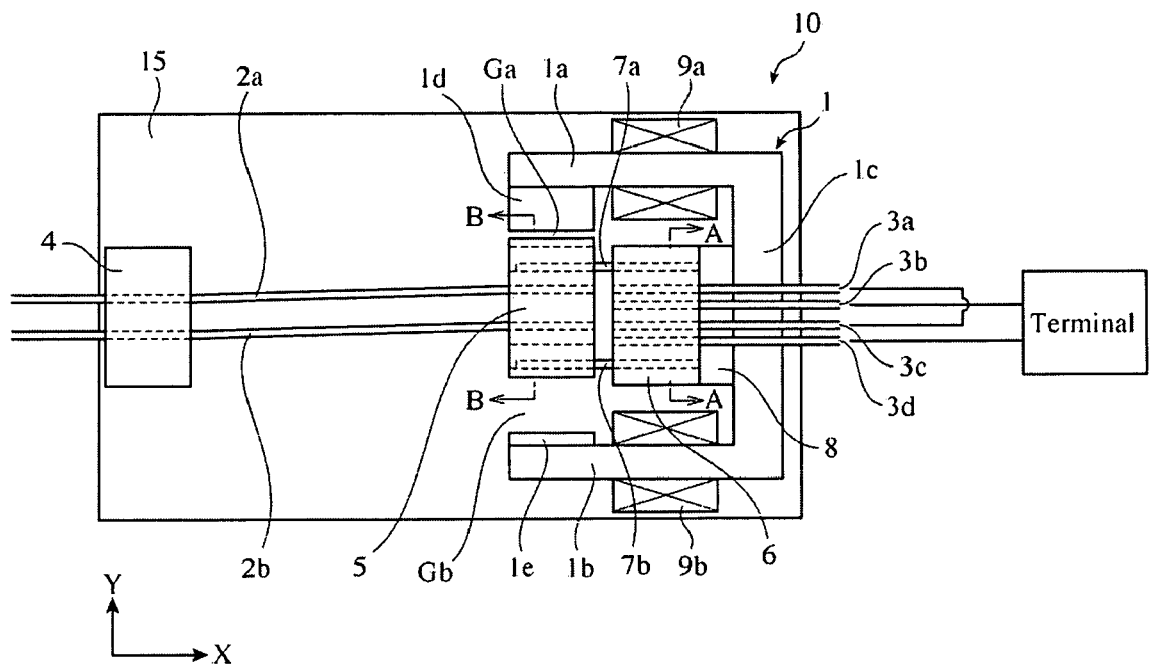
FIG. 1(*a*) is a plan view showing an optical switch according to the first embodiment of the present invention.

As an example of the non-latching optical switch of the present invention operated by an electromagnetic force, a 2×4 optical switch will be explained referring to FIGS. 1-3. Fixed to a non-magnetic substrate 15 are an electromagnetic actuator 10 for moving a movable block 5, and a block 4 for supporting movable optical fibers 2a, 2b. The substrate 15 need only be non-magnetic, and it may be formed by non-magnetic materials such as stainless steel, ceramics, glass, etc. The electromagnetic actuator 10 comprises a soft magnetic yoke 1 made of, for instance, soft magnetic iron or Parmalloy, a stationary soft magnetic block 6 made of, for instance, soft magnetic ceramics such as soft magnetic ferrite, a permanent magnet 8 made of, for instance, an neodymium-iron-boron alloy, and coils 9a, 9b. The support block 4 and the stationary block 6 are fixed to the substrate 15, such that the movable optical fibers 2 are in parallel with the stationary optical fibers 3.

The soft magnetic yoke 1 is preferably in a U or E shape, etc., having a pair of arms. FIG. 1(a) shows a U-shaped yoke having a pair of arms 1a, 1b extending from both ends of a base portion 1c such that they sandwich the movable block 5. A stationary block 6 is fixed to a center of the base portion 1c of the yoke 1 via the permanent magnet 8. The stationary block 6 may be directly fixed to the base portion 1c. The permanent magnet may be made of neodymium-iron-boron magnets, or other types of permanent magnets such as samarium-cobalt magnets, etc., and the neodymium-iron-boron magnets are more preferable because of a high residual magnetic flux density. The stationary block 6 supports the end portions of the stationary optical fibers 3a, 3b, 3c, 3d, such that they oppose the end portions of the movable optical fibers 2a, 2b.

The coils 9a, 9b are mounted to the arms 1a, 1b of the yoke 1. Though one coil may be mounted to the yoke 1, it is preferably mounted to each arm 1a, 1b for easy control of a magnetic flux and for securing a winding space. Each plate-shaped tip yoke member 1d, 1e is attached to the inner surface of each arm 1a, 1b of the yoke 1 in a tip end portion, such that it is opposite to each side surface of the movable block 5 with a predetermined gap.

The coils 9a, 9b are energized to generate a magnetic flux flowing through the yoke 1 and the movable block 5. The amount of a magnetic flux can be controlled by changing the ON/OFF, polarity, amount, etc. of electric current supplied to the coils 9a, 9b. The movable optical fibers can be switched to either one of an unlatched state (non-self-holding state) or a latched state (self-holding state) by turning on and off the coils 9a, 9b.

Figure 2A:
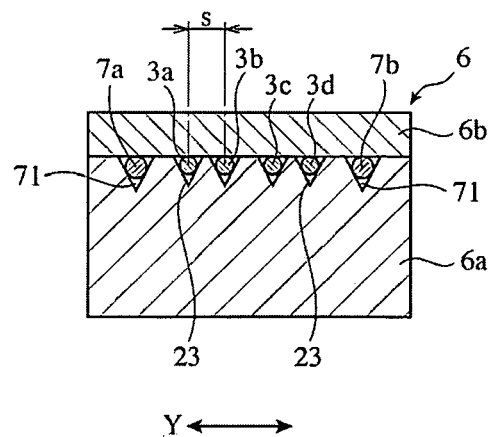
FIG. 2(*a*) is an enlarged cross-sectional view taken along the line A-A in FIG. 1(*a*)

As shown in FIG. 2(a), the stationary block 6 comprises a soft magnetic block body 6a, and a glass-made cover plate 6b fixed to the block body 6a. The soft magnetic block body 6a is provided on an upper surface with four V-shaped grooves 23 for fixing four stationary optical fibers 3a, 3b, 3c, 3d, and V-shaped grooves 71, 71 on both sides for fixing two positioning pins 7a, 7b made of a hard metal in parallel. The longitudinal direction of the optical fibers is designated as an X-axis direction, and its perpendicular direction is designated as a Y-axis direction.

Figure 1B:
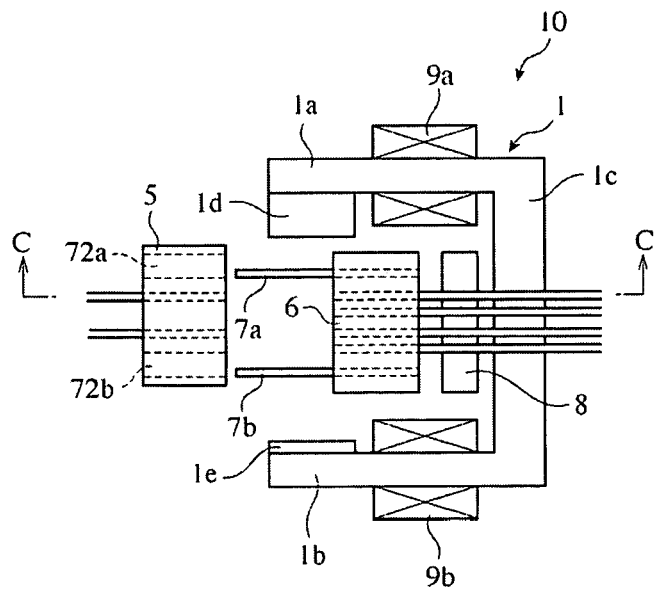
Figure 1C:
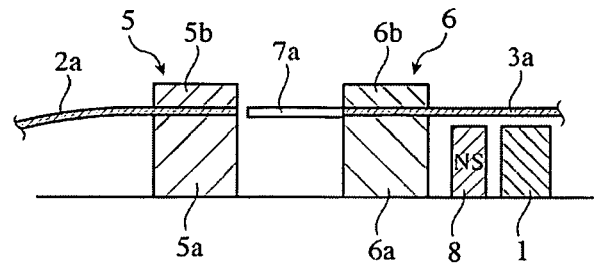
Figure 2B:
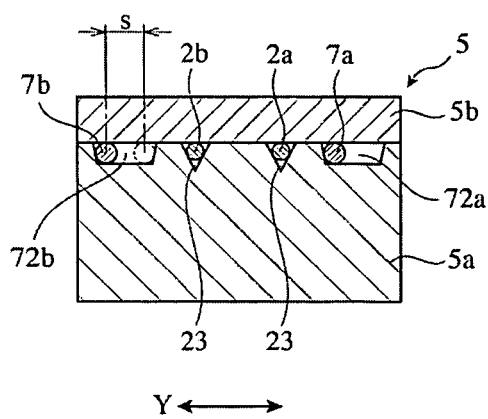

As shown in FIGS. 1(b) and 2(b), a movable block 5 opposing the stationary block 6 with a predetermined gap comprises a soft magnetic block body 5a, and a glass-made cover plate 5b fixed thereto. The block body 5a is provided on an upper surface with two V-shaped grooves 23 for fixing two movable optical fibers 2a, 2b, and trapezoidal grooves 72a, 72b for receiving two positioning pins 7a, 7b in parallel. Each groove 72a, 72b has a width making the pins 7a, 7b movable over the same distance as the switching distance s of the stationary optical fibers 3a, 3b, and 3c, 3d. The movable block 5 supports the tip end portions of the movable optical fibers 2a; 2b, and the positioning pins 7a, 7b received in the trapezoidal grooves 72a, 72b make the block 5 movable in a Y-axis direction by the distance s. Each part in the optical switch 1 is as high as, for instance, shown in FIG. 1(c).

Both of the movable block 5 and the stationary block 6 are made of soft magnetic materials. To have a sufficient magnetic attraction to the yoke 1, the soft magnetic materials preferably have a saturation magnetic flux density of 0.3 T (3 kG) or more. The soft magnetic materials are preferably soft magnetic ceramics, particularly soft magnetic ferrite. Because the soft magnetic ferrite can be worked at high precision and has a thermal expansion coefficient closer to that of glass forming optical fibers than those of soft magnetic metals, it provides a high-reliability optical switch. Also, because the soft magnetic ferrite has a lower density than those of soft magnetic metals, it is suitable for the movable block 5. When the holder 4 is also formed by the same soft magnetic ferrite, there is no difference in a thermal expansion coefficient among the holder 4, the movable block 5 and the stationary block 6, so that no positional discrepancy occurs in the optical fibers by temperature change on both movable and stationary sides.

The preferred soft magnetic ferrite is manganese-zinc ferrite, nickel-zinc ferrite, etc. The manganese-zinc ferrite is particularly preferable because of high permeability and saturation magnetic flux density.

With end portions of the movable optical fibers 2a, 2b and the stationary optical fibers 3a, 3b, 3c, 3d near their connections supported by the movable block 5 and the stationary block 6, the positional discrepancy of the optical fibers can be prevented during operation, resulting in high positioning accuracy. In addition, because the movable block 5 made of soft magnetic ferrite suffers little elastic deformation, its positional discrepancy and warpage can be suppressed during the operation even if it is made small and thin.

Because the trapezoidal grooves 72a, 72b of the movable block 5 regulate a range in which the positioning pins 7a, 7b can move, both ends of the trapezoidal grooves 72a, 72b function as stoppers for the movable block 5, thereby positioning the movable optical fibers 2 to the stationary optical fibers 3. The trapezoidal grooves 72a, 72b also function as vertical guides when the movable block 5 moves in a Y-axis direction. Incidentally, the positioning of the movable block 5 can be achieved not only by a combination of the positioning pins 7a, 7b and the trapezoidal grooves 72a, 72b, but also by guides, stoppers, etc. disposed outside the movable block 5.

The optical switch in this embodiment meets the requirements of a<b, and (a+s)<(b−s), wherein a represents the width of an air gap Ga (first gap) between the movable block 5 and the tip yoke member 1d at a home position, b represents the width of an air gap Gb (second gap) between the movable block 5 and the tip yoke member 1e at a home position, and s represents the moving distance of the movable block 5. Accordingly, when no electric current is supplied to the coils 9a, 9b, a magnetic flux passes always more through the air gap Ga than through the air gap Gb, so that the movable block 5 is attracted toward the tip yoke member 1d. At this time, it is said that the movable block 5 is at a home position. The movable block 5 is held on the side of the tip yoke member 1d at the home position, so that the movable optical fiber 2a is connected to the stationary optical fiber 3a, and that the movable optical fiber 2b is connected to the stationary optical fiber 3c.

Figure 3A:
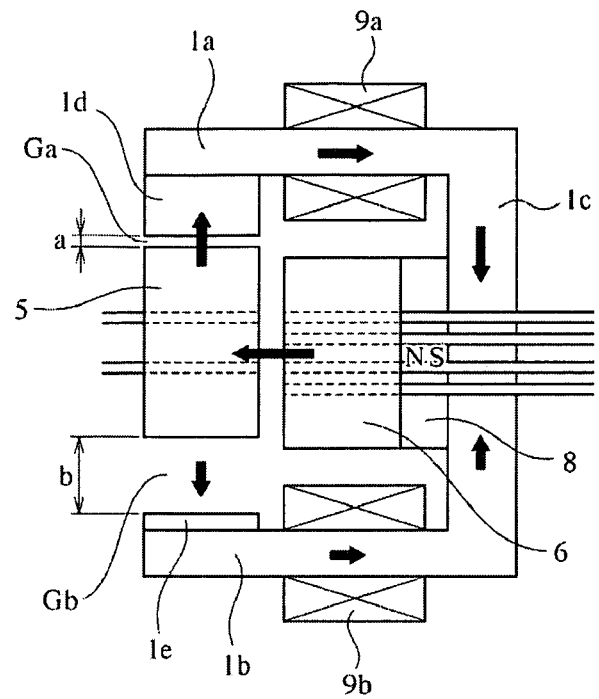
FIG. 3(*a*) is a schematic view showing the magnetic flux of a permanent magnet when a movable block is held at a home position in the optical switch of FIG. 1(*a*)

In FIG. 3(a), the flow of a magnetic flux generated by the permanent magnet 8 at a home position is shown by black arrows. For the clarification of explanation, the distances between the movable block 5 and the tip yoke members 1d, 1e are exaggerated. The magnetic flux generated by the permanent magnet 8 flows through a first magnetic flux path of stationary block 6→movable block 5→tip yoke member 1d→arm 1a→base portion 1c→permanent magnet 8, and a second magnetic flux path of stationary block 6→movable block 5→tip yoke member 1e→arm 1b→base portion 1c→permanent magnet 8. Because the width a of the air gap Ga is sufficiently smaller than the width b of the air gap Gb at the home position, a magnetic flux passing through the air gap Ga is much more than a magnetic flux passing through the air gap Gb. Because a magnetic attraction force F expressed by the formula: $F=\Phi^2/2 \mu A$, wherein $\Phi$ represents the amount of a magnetic flux passing through an air gap, A represents the area of the air gap, and $\mu$ is the permeability of the air gap, is proportional to the square of the magnetic flux, the movable block 5 is surely attracted toward the tip yoke member 1d. Incidentally, the "air gap" means a space between magnetic bodies, which may be filled with a gas such as air, etc., or a liquid such as a matching oil, etc.

Because there are the movable block 5, the stationary block 6 and the permanent magnet 8 inside the yoke 1 between both arms 1a, 1b in the optical switch in this embodiment, the magnetic flux from the permanent magnet 8 is prevented from leaking. Accordingly, a magnetic flux can be introduced into air gaps between the movable block 5 and both arms 1a, 1b more efficiently in this optical switch than in an optical switch comprising no stationary block so that magnetic poles of the permanent magnet are open. Such arrangement is suitable for having different gaps between the movable block 5 and a pair of arms 1a, 1b. Thus, a magnetic circuit formed by the permanent magnet 8 is divided to a first magnetic flux path having a larger amount of a magnetic flux and a second magnetic flux path having a smaller amount of a magnetic flux, resulting in different attraction forces to the movable block 5. As a result, when the coils 9a, 9b are not energized, the movable block 5 is surely held at the home position.

Figure 3B:
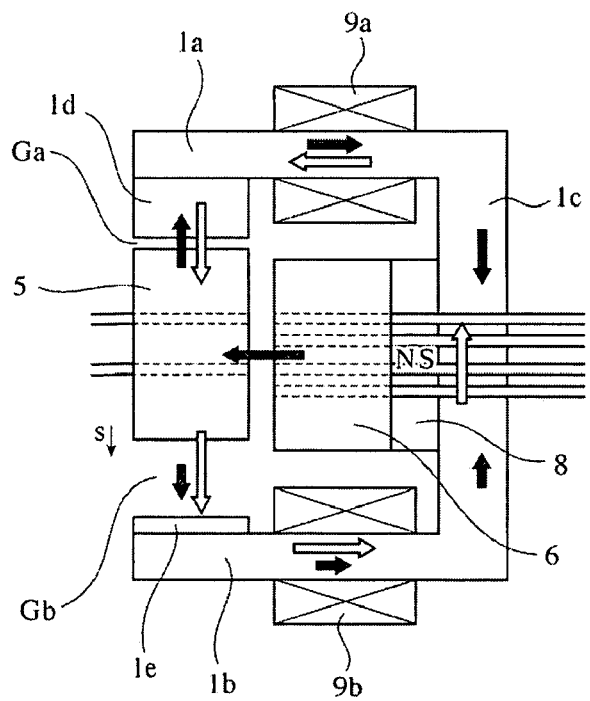

FIG. 3(b) shows switching from a home position to a make position. Supplied to the coils 9a, 9b is electric current for generating a magnetic flux shown by white arrows, which cancels the magnetic flux from the permanent magnet 8 in the air gap Ga, and enhances the magnetic flux from the permanent magnet 8 in the air gap Gb. Though the coils 9a, 9b may be separately controlled, it is preferable for the simplicity of control to connect the coils 9a, 9b in series such that the same electric current flows therethrough. The magnetic flux generated by the coils 9a, 9b flows through a path of yoke 1→tip yoke member 1d→movable block 5→tip yoke member 1e→yoke 1. Accordingly, the movable block 5 moves from the side of the tip yoke member 1d to the side of the tip yoke member 1e (make position) by the magnetic flux passing through both air gaps Ga, Gb (the magnetic flux from the permanent magnet 8+the magnetic flux of the coils 9a, 9b). At the make position, the movable optical fiber 2a is coupled to the stationary optical fiber 3b, and the movable optical fiber 2b is coupled to the stationary optical fiber 3d.

Figure 3C:
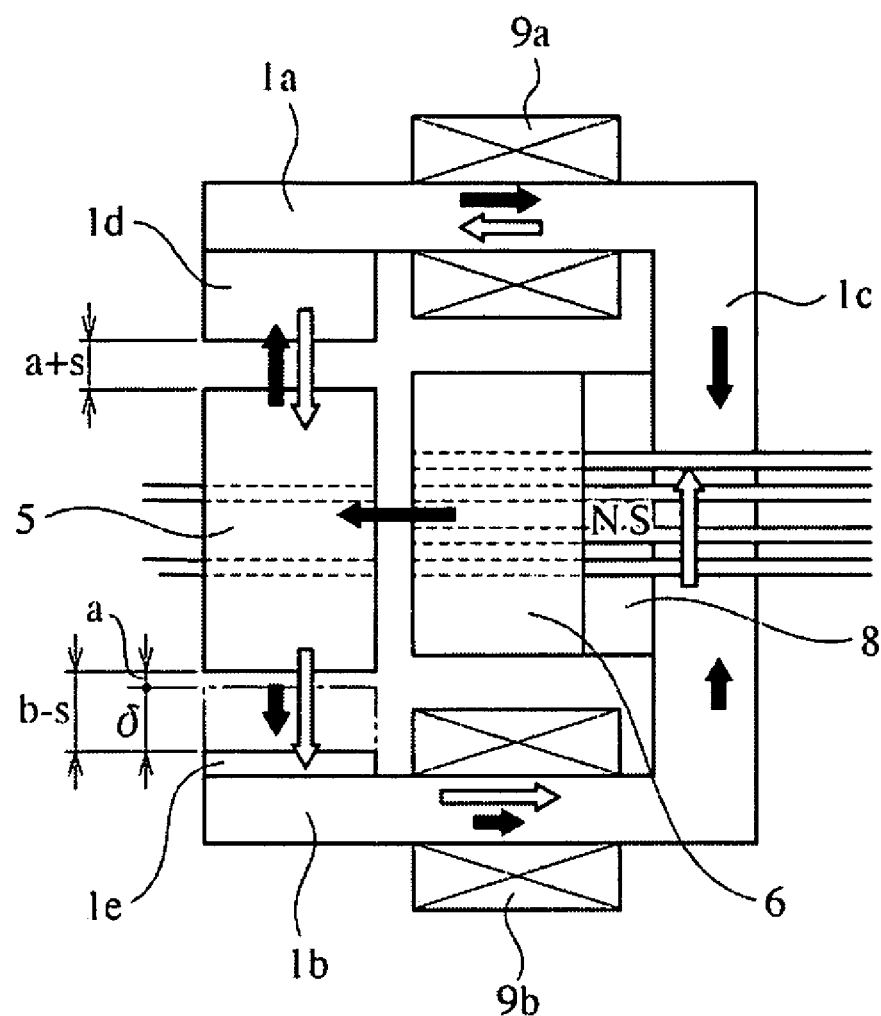

FIG. 3(c) shows the width of each air gap Ga, Gb when the movable block 5 is at the make position. As described above, though the width (a+s) of the air gap Ga is sufficiently smaller than the width (b−s) of the air gap Gb at the make position, the magnetic flux generated by the coils 9a, 9b makes the total magnetic flux passing through the air gap Ga less than the total magnetic flux passing through the air gap Gb, so that the movable block 5 is kept attracted toward the tip yoke member 1e and thus held at the make position. Thus, the formation of two magnetic paths enables the operation of the electromagnetic actuator 10 by small electric current. Particularly when two coils 9a, 9b are connected in series, the operation can be conducted by extremely small electric current. As a result, electricity consumption can be extremely suppressed even in a non-latching optical switch that should be energized to keep the make position.

When electric current is not supplied to the coils 9a, 9b by the breakdown of current-supplying signals, power breakdown, etc., the coils 9a, 9b stops generating a magnetic flux, leaving only the magnetic flux from the permanent magnet 8. Thus, the movable block 5 is put in the state shown in FIG. 3(a), returning to the home position by attraction toward the tip yoke member 1d. Thus, the movable block 5 is held at the make position while a terminal device is operated normally, but when electric signals or electric energy is not supplied by abnormality in the terminal device, the movable block 5 cannot be held at the make position, automatically returning to the home position. This non-latching operation is achieved by meeting (a+s)<(b−s). In order that the movable block 5 is surely switched to the home position despite a large mass or the influence of gravity, the difference (b−a−2s) between the width (a+s) of the air gap Ga and the width (b−s) of the air gap Gb at the make position is preferably 0.3 mm or more.

In the case of the self-holding optical switch (U.S. Pat. No. 6,169,826), an air gap Gb between a tip yoke member 1e shown by a phantom line in FIG. 3(c) and a movable block 5 has a width a. In the optical switch of this embodiment, however, the air gap Gb has a width (b−s). Accordingly, the setback distance δ is [(b−s)−a]. The difference between the width of the air gap Ga and the width of the air gap Gb has correlation with the setback distance δ.

[2] Second Embodiment

Figure 6:
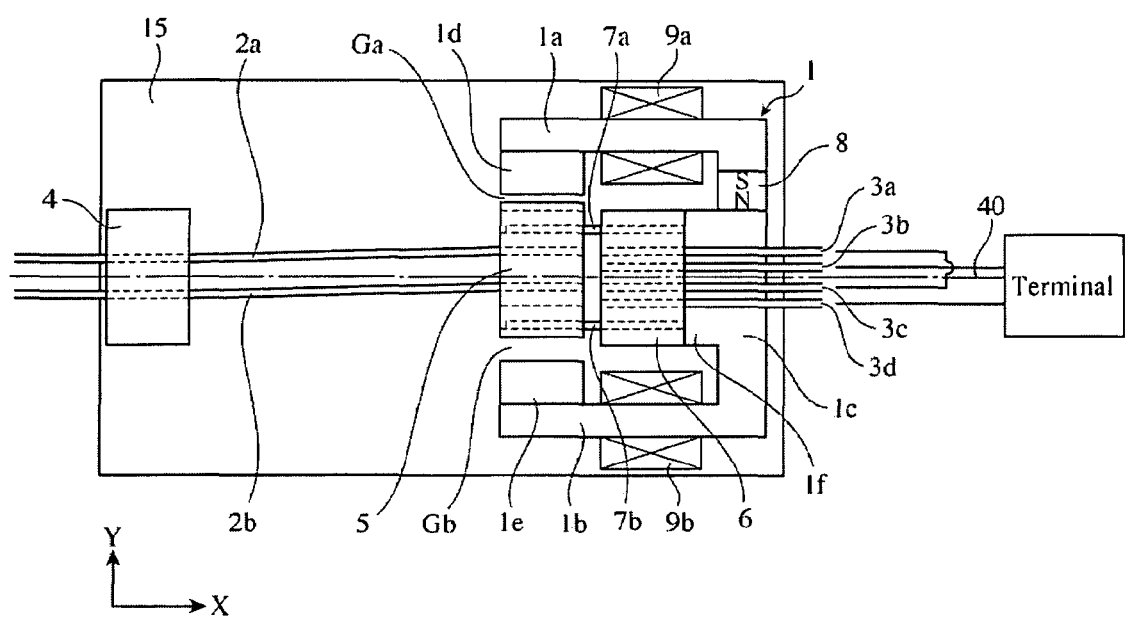
FIG. 6 is a plan view showing an optical switch according to the second embodiment of the present invention.

The optical switch in the second embodiment comprises a permanent magnet attached to part of the yoke. Accordingly, the requirements of (a+s)<(b−s), and δ[=(b−s)−a]>0 need not be met. A specific example of this optical switch is shown in FIGS. 6 and 7. The same reference numerals are assigned to the same parts as in the first embodiment, and their explanations will be omitted.

Figure 7A:
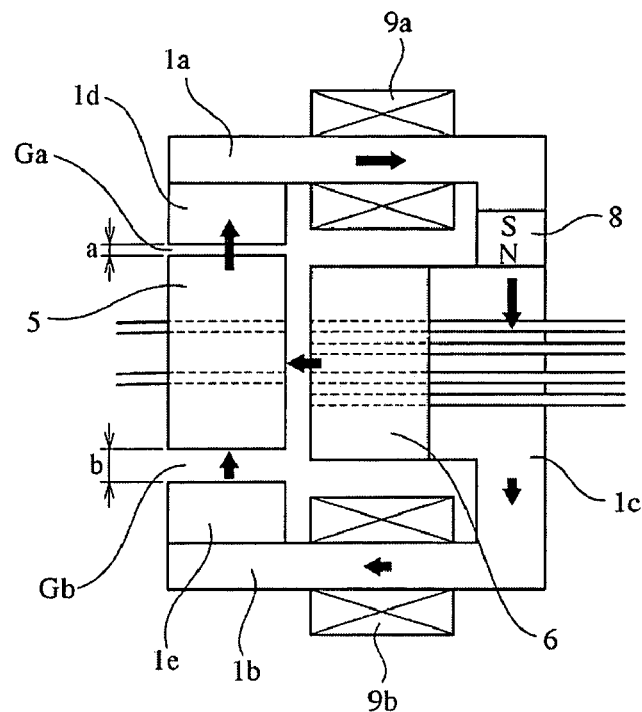
FIG. 7(*a*) is a schematic view showing the magnetic flux of a permanent magnet when a movable block is held at a home position in the optical switch of FIG. 6.

As shown in FIG. 6, a substantially E-shaped yoke 1 having a pair of arms 1a, 1b is provided with a projection 1f at a center of its base portion 1c, and a permanent magnet 8 is arranged in the base portion 1c at a position deviated toward the arm 1a from a longitudinal center line 40 extending at the middle of a pair of arms 1a, 1b. FIG. 7(a) shows a state in which a movable block 5 is held at a home position on the side of a tip yoke member 1d. In this state, a magnetic flux generated by the permanent magnet 8 shown by black arrows is divided to a first magnetic flux path of base portion 1c→stationary block 6→movable block 5→tip yoke member 1d→arm 1a, and a second magnetic flux path of base portion 1c→arms 1b→tip yoke member 1e→movable block 5→tip yoke member 1d→arm 1a.

Instead of mounting the permanent magnet 8 in the base portion 1c, it may be mounted at a position of the tip yoke member 1d.

While there is only the second magnetic flux path in the air gap Gb between the tip yoke member 1e and the movable block 5, the air gap Ga between the movable block 5 and the tip yoke member 1d has the first and second magnetic flux paths, resulting in a sufficiently larger amount of a magnetic flux in the air gap Ga than in the air gap Gb. The different amounts of a magnetic flux result in difference in a magnetic attraction force, so that while no electric current is supplied to the coils 9a, 9b, the movable block 5 is held on the side of the tip yoke member 1d to connect a movable optical fiber 2a to a stationary optical fiber 3a, and a movable optical fiber 2b to a stationary optical fiber 3c.

Figure 7B:
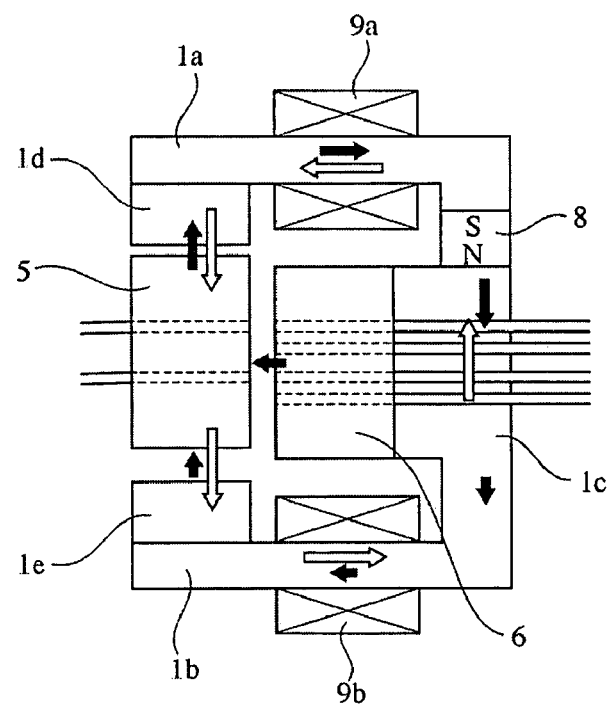

FIG. 7(b) shows the switching from a home position to a make position. Because a magnetic flux (shown by white arrows) generated from the current-supplied coils 9a, 9b is opposite in direction to the magnetic flux from the permanent magnet 8, and sufficiently larger than the latter, the total magnetic flux is sufficiently more in the air gap Gb than in the air gap Ga. Thus, the movable block 5 can be held at the make position only by supplying current to the coils 9a, 9b.

Figure 7C:
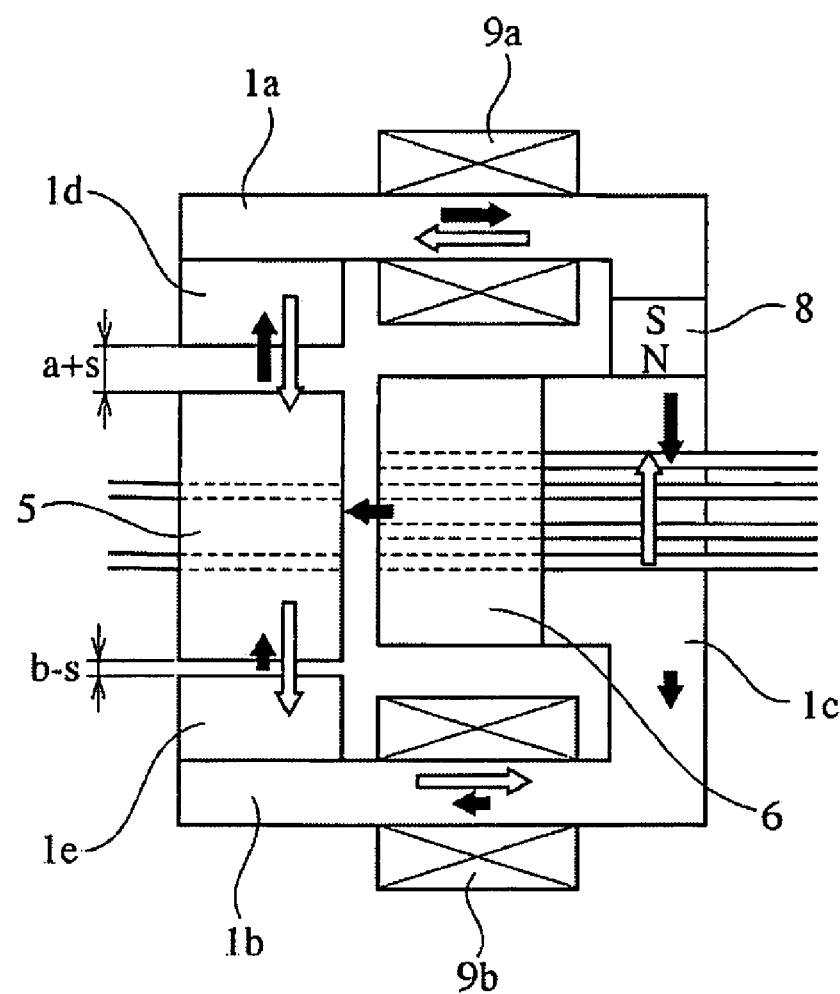

FIG. 7(c) shows the widths of the air gaps Ga, Gb when the movable block 5 is at the make position. The depicted example meets the requirement of (a+s)=b, but it is not indispensable. Though the widths of the air gaps Ga, Gb at the make position are (a+s) and (b−s), respectively, the magnetic flux from the permanent magnet 8 is sufficiently more in the air gap Ga than in the air gap Gb. Accordingly, when the supply of electric current to the coils 9a, 9b stops by the breakdown of signals of supplying current to the coils, power breakdown, etc., the movable block 5 automatically returns to the home position on the side of the tip yoke member 1d. When the operation of a terminal device is turned normal, the movable block 5 moves to and held at the make position by the magnetic flux generated by the coils 9a, 9b. Accordingly, the optical switch of this embodiment is also a non-latching optical switch.

Third Embodiment

Figure 8:
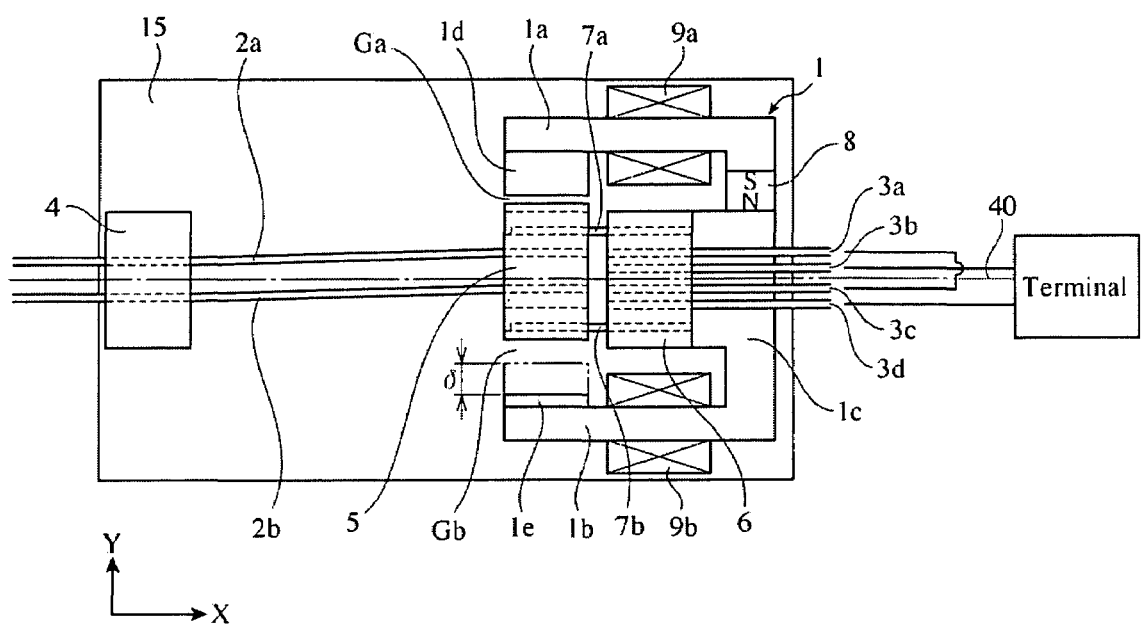
FIG. 8 is a plan view showing an optical switch according to the third embodiment of the present invention.
Figure 9A:
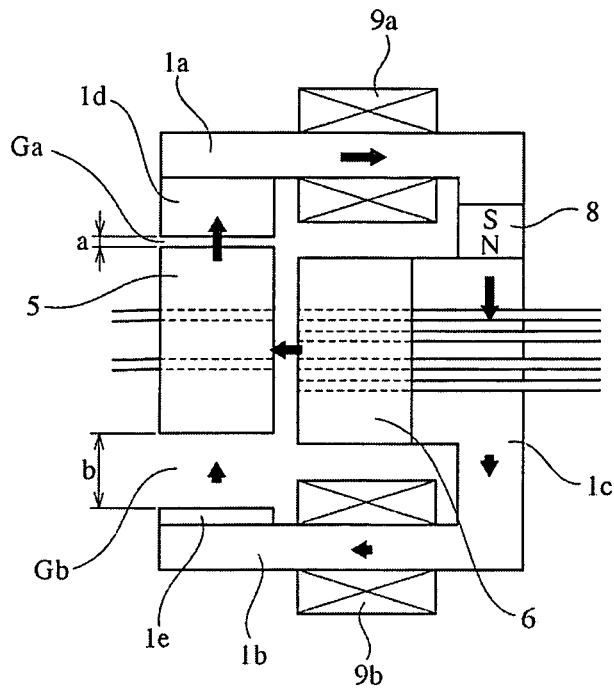
FIG. 9(*a*) is a schematic view showing the magnetic flux of a permanent magnet when a movable block is held at a home position in the optical switch of FIG. 8.

The third embodiment does not differ from the second embodiment except for meeting the requirements of (a+s)< (b−s), and δ[=(b−s)−a]>0. Thus, the same reference numerals are assigned to the same parts as in the second embodiment, and their explanations will be omitted. FIG. 8 shows the optical switch of the third embodiment at a home position. A tip yoke member 1e is thinner than the tip yoke member of the second embodiment (shown by a chain line) by a setback distance δ. As shown in FIGS. 9(a) and (c), when the movable block 5 is at a make position, the widths of air gaps Ga, Gb are (a+s) and (b−s), respectively, wherein a and b represent the widths of the air gaps Ga, Gb when the movable block 5 is at a home position, and s represents the moving distance of the movable block 5. The setback distance δ is expressed by [(b−s)−a].

In the third embodiment, because the air gap Gb is wider than that in the second embodiment by a setback distance δ, the magnetic flux from the permanent magnet 8 (shown by black arrows) passes through the air gap Ga more in the third embodiment than in the second embodiment, and through the air gap Gb less in the third embodiment than in the second embodiment. Accordingly, when no electric current is supplied to the coils 9a, 9b, the movable block 5 is held at the home position on the side of the tip yoke member 1d more strongly in the third embodiment than in the second embodiment.

Figure 9B:
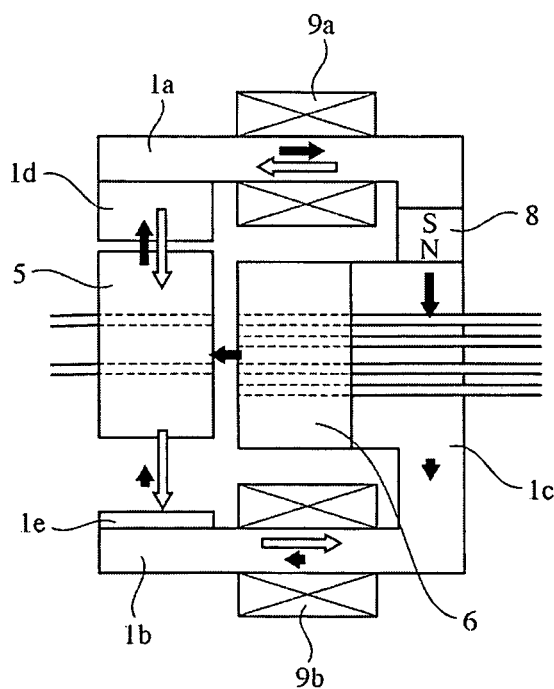

FIG. 9(b) shows switching from the home position to the make position. When electric current is supplied to the coils 9a, 9b to generate a magnetic flux (shown by white arrows), the magnetic flux (shown by black arrows) from the permanent magnet 8 and the magnetic flux (shown by white arrows) from the coils 9a, 9b cancel each other in the air gap Ga, and the magnetic flux from the coils 9a, 9b is sufficiently more than the magnetic flux from the permanent magnet 8 in the air gap Gb. Accordingly, the total magnetic flux is more in the air gap Gb than in the air gap Ga, thereby moving the movable block 5 from the side of the tip yoke member 1d to the side of the tip yoke member 1e.

Figure 9C:
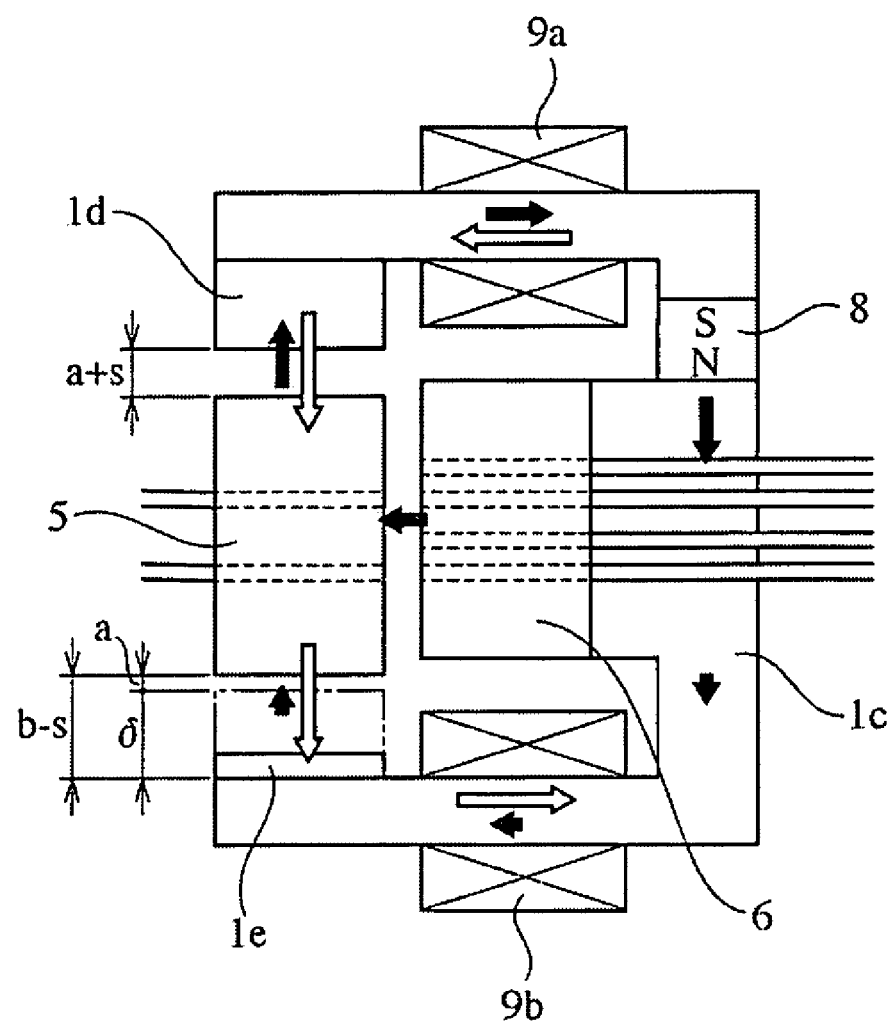

FIG. 9(c) shows the widths of the air gaps Ga, Gb when the movable block 5 is at the make position. Because they are the same as in the first embodiment, their explanation will be omitted. As described above, because the magnetic flux from the permanent magnet 8 (shown by black arrows) passes through the air gap Ga more in the third embodiment than in the second embodiment, and through the air gap Gb less in the third embodiment than in the second embodiment, the movable block 5 returns to and is held at the side of the tip yoke member 1d more strongly than in the second embodiment, when electric current is not supplied to the coils 9a, 9b by the breakdown of signals for supplying current to the coils, power breakdown, etc.

Because the magnetic flux generated by the permanent magnet 8 is divided to a path passing through only one arm 1a, and a path passing through both arms 1a, 1b in the second and third embodiments, in either of a case (a) meeting the requirement of (a+s)=b as shown in FIGS. 6 and 7, and a case (b) meeting the requirements of (a+s)<(b−s), and δ[=(b−s)−a]>0 as shown in FIGS. 8 and 9, the magnetic flux from the permanent magnet 8 is more in the air gap Ga on the side of the arm 1a than in the air gap Gb on the side of the arm 1b. In this respect, there is no difference from the first embodiment in which the permanent magnet 8 is mounted to a center of the base portion 1c of the yoke 1.

In any of the above optical switches, the magnetic flux from the permanent magnet 8 is more in the air gap Ga than in the air gap Gb, so that the movable block 5 is held at the home position when the coils 9a, 9b are not energized. Because the total magnetic flux is less in the air gap Ga than in the air gap Gb while the coils 9a, 9b are energized, the movable block 5 is held at the make position. However, when current supply to the coils 9a, 9b is stopped, the movable block 5 automatically returns to the home position. Accordingly, the optical switch of this embodiment is also a non-latching optical switch.

Various modifications may be added unless they are deviated from the idea of the present invention. For instance, the yoke is in an E shape in the above embodiment, but this is not restrictive. The yoke need only have substantially parallel arms, and it may be, for instance, in a U shape. The arms and the base portion of the yoke may be integral, or they may be separate parts. Also, integral L-shaped arms may be abutted to the base portion.

The permanent magnet may be sandwiched by adjacent yoke portions, for instance, in the case of an assembled yoke, or mounted to a recess in the case of an integral yoke.

To movably receive pins for positioning at the home position and the make position, grooves formed in the block bodies of the movable block and the stationary block are not restricted to be trapezoidal, but may be square in cross section. Grooves for fixing the optical fibers and grooves for receiving the pins may be formed in the block body and/or the cover plate.

Instead of using two different-thickness tip yoke members, the setback distance δ may be obtained by adjusting the positions of both arms. The position adjustment of both arms may be achieved by soft magnetic spacers disposed between the arms and the base portion of the yoke. In this case, the tip yoke members may be eliminated. To make the amounts of the magnetic flux passing through the air gaps Ga, Gb unequal, the yoke may be provided with a gap at a position deviated from the longitudinal center line 40, or a non-magnetic body or a low-permeability body may be inserted into the gap.

The cover plate is not restricted to being made of glass, but may be made of the same soft magnetic ceramics as those of the movable block and the stationary block to have the same thermal expansion coefficient.

The present invention will be explained in further detail referring to Examples below, without intension of restricting the present invention thereto.

EXAMPLE 1

The operation of the optical switch shown in FIG. 1 was tested. All of a support block 4, a movable block 5 and a stationary block 6 were made of manganese-zinc ferrite having a saturation magnetic flux density of 0.47 T (4,700 G), a permeability of 1,500 (at 1 kHz) and a thermal expansion coefficient of $115 \times 10^{-7}/°$ C. The movable block 5 was as thick as 1.9 mm, and as wide as 3 mm in an X-axis direction and 2.5 mm in a Y-axis direction. Each tip yoke member 1d, 1e made of SS400 (JIS) had an attraction surface of 2 mm×1.9 mm, opposing the movable block 5 in a Y-axis direction. Each coil 9a, 9b had 500 turns. At a home position, the width a of the air gap Ga between the tip yoke member 1d and the movable block 5 was 0.075 mm, and the moving distance s of the movable block 5 was 0.25 mm.

Figure 4:
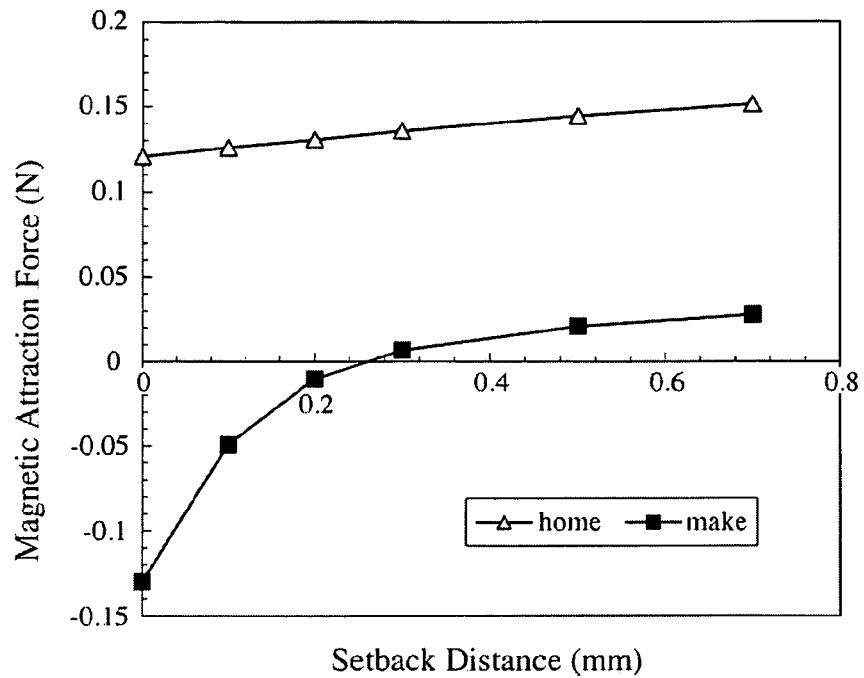
FIG. 4 is a graph showing the relation between a setback distance and a magnetic attraction force in an air gap in Example 1.

With no electric current supplied to the coils 9a, 9b, the width b of the air gap Gb was increased to measure a magnetic attraction force in the air gaps Ga, Gb. The results are shown in FIG. 4. The magnetic attraction force was defined as "plus" in a direction to the home position and "minus" in a direction to the make position.

As is clear from FIG. 4, when the magnetic attraction force was zero at the make position (switching occurred from the make position to the home position), a setback distance [(b−s)−a] was about 0.25 mm. At this time, a+s=0.325 mm, and b−s=δ+a=0.325 mm. Accordingly, when the setback distance is set more than 0.25 mm, the condition of (a+s)<(b−s) is met, always generating a force of returning to the home position. When the setback distance δ is 0, it is a self-holding optical switch.

Figure 5:
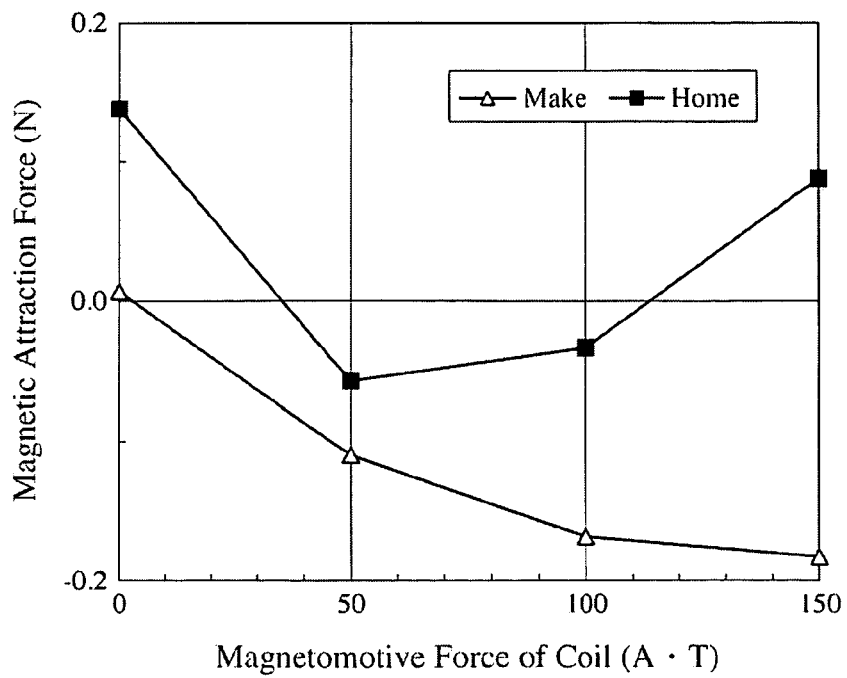
FIG. 5 is a graph showing the relation between the magnetomotive force of a coils and a magnetic attraction force in an air gap in Example 1.

With the setback distance changed to 0.3 mm, the coils 9a, 9b were energized to measure a magnetic attraction force at the home position and the make position. The results are shown in FIG. 5. As is clear from FIG. 5, when electric current of about 30 A·T or more is supplied to each coil 9a, 9b, the movable block 5 can be moved from the home position to the make position.

A Transmitting light loss was as small as −0.5 dB between −20° C. and +80° C.

EXAMPLE 2

The operation of the same optical switch as in Example 1 except that the width of a movable block 5 was 2 mm in an X-axis direction and 3.2 mm in a Y-axis direction width was tested, with a setback distance δ changed from 0.5 mm to 0.7 mm and to 0.75 mm, namely [(b−s)−(a+s)] changed from 0.25 mm to 0.45 mm and to 0.5 mm. As a result, when the setback distance δ was 0.7 mm and 0.75 mm, namely when [(b−s)−(a+s)] was 0.45 mm and 0.5 mm, a non-latching operation was surely conducted. However, when the setback distance δ was 0.5 mm, namely when [(b−s)−(a+s)] was 0.25 mm, the magnetic attraction force was too small to always conduct a non-latching operation. It is thus clear that the difference (b−a−2s) between the width (a+s) of the air gap Ga and the width (b−s) of the air gap Gb is preferably 0.3 mm or more. The transmitting light loss was as small as in Example 1.

EXAMPLE 3

The operation of the optical switch shown in FIG. 6 with a movable block 5 as thick as 1.9 mm and as wide as 3 mm in an X-axis direction and 2.5 mm in a Y-axis direction was tested. Each tip yoke member 1d, 1e made of SS400 (JIS) had an attracting surface of 2 mm in width and 1.9 mm in thickness, opposing the movable block 5 in a Y-axis direction. Each coil 9a, 9b had 500 turns. At a home position, the width a of the air gap Ga between the tip yoke member 1d and the movable block 5 was 0.075 mm, the width b of the air gap Gb between the tip yoke member 1e and the movable block 5 was 0.325 mm, and the width of an air gap between the movable block 5 and the stationary block 6 was 0.35 mm. The moving distance s of the movable block 5 was 0.25 mm.

Figure 10:
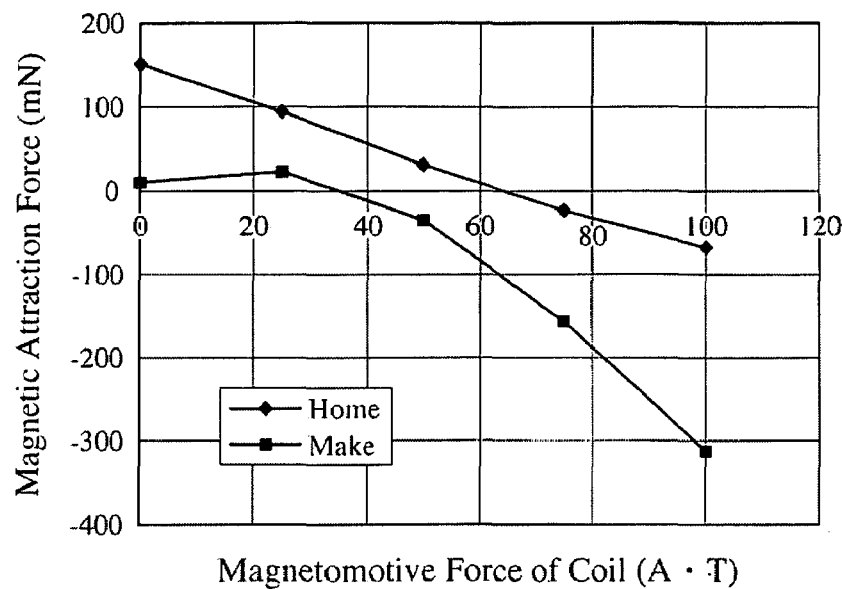
FIG. 10 is a graph showing the relation between the magnetomotive force of coils and a magnetic attraction force in Example 3.
Figure 11:
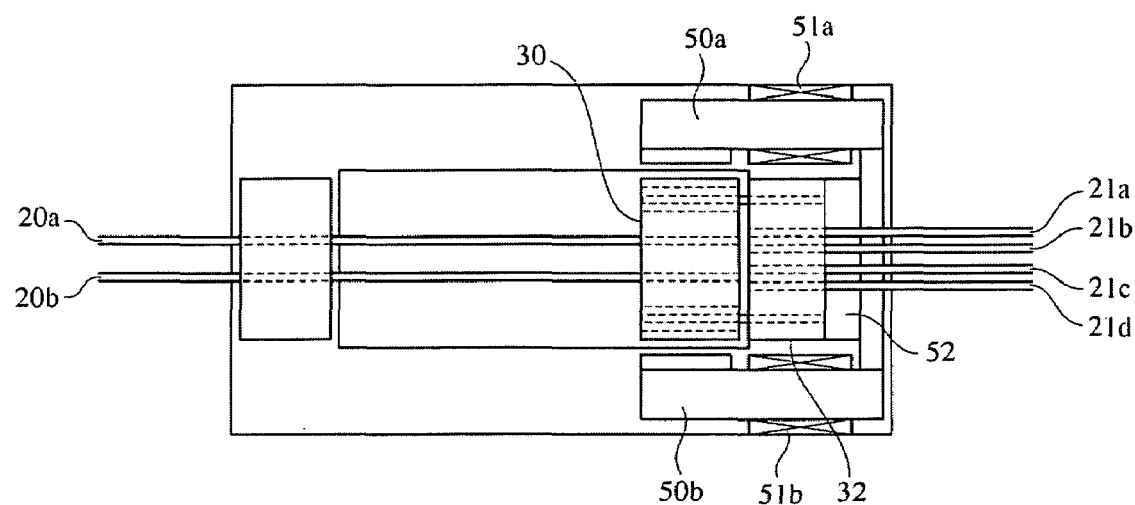
FIG. 11 is a plan view showing a conventional optical switch described in U.S. Pat. No. 6,169,826.

With the same amount of electric current supplied to both coils 9a, 9b, a magnetic attraction force was measured at the movable block 5 and the tip yoke member at the home position and the make position, respectively. The results are shown in FIG. 10. The magnetic attraction force at the home position was 0 at about 65 A·T. It is clear that when more electric current is supplied, it is turned to the make position. It is also clear that when electric current is shut off, the magnetic attraction force becomes plus even at the make position, so that it automatically returns to the home position. The transmitting light loss was as small as in Example 1.

EFFECT OF THE INVENTION

As described above, in the non-latching optical switch of the present invention for moving movable optical fibers by an electromagnetic force to mechanically switch optical paths, which is small and high in precision, the optical paths can automatically return to a home position at the time of abnormality such as the shutoff of a power source or a control signal. The optical switch of the present invention having such feature is suitable for optical communications apparatuses, light transmission apparatuses, etc.

What is claimed is:

1. An optical switch for switching the connection of one or more movable optical fibers to one or more stationary optical fibers, comprising a movable soft magnetic block connected to an end portion of each movable optical fiber, a stationary soft magnetic block connected to each stationary optical fiber and fixed at a position opposing said movable block, an actuator for moving said movable block relative to said stationary block, and a means for positioning said movable block relative to said stationary block; said actuator comprising a yoke having a base portion and a pair of arms extending from both ends of said base portion such that they sandwich said movable block in its moving direction, a permanent magnet attached to said base portion of said yoke, and a coil mounted to at least one arm; and regardless of the position of said movable block, a magnetic flux generated by said permanent magnet being more in a first gap between one arm and said movable block than in a second gap between the other arm and said movable block, wherein said movable block moves between a home position closest to said one arm and a make position closest to said other arm; wherein when said coil is energized to generate a magnetic flux, the total magnetic flux is less in a first gap between said movable block and said one arm than in a second gap between said movable block and said other arm, so that said movable block is held at said make position; and wherein when said coil becomes inactive, the total magnetic flux in said first gap is more than in said second gap and causes said movable block to return to said home position under a magnetic attractive force of said permanent magnet.

2. The optical switch according to claim 1, wherein said first and second gaps have different widths in the moving direction of said movable block.

3. The optical switch according to claim 1, wherein a setback distance δ expressed by δ=(b−s)−a is more than 0, wherein a and b respectively represent the widths of said first and second gaps at said home position, and s represents the moving distance of said movable block.

4. The optical switch according to claim 1, wherein at least one of said movable block and said stationary block is made of a soft magnetic ferrite.

5. The optical switch according to claim 4, wherein said soft magnetic ferrite is manganese-zinc ferrite.

6. The optical switch according to claim 1, wherein said coil is mounted to each arm of said yoke.

7. An optical switch for switching the connection of one or more movable optical fibers to one or more stationary optical fibers, comprising a movable soft magnetic block connected to an end portion of each movable optical fiber, a stationary son magnetic block connected to each optical fiber and fixed at a position opposing said movable block, an actuator for moving said movable block relative to sad stationary block, and a means for positioning said movable block relative to said stationary block; said actuator comprising a yoke having a base portion and a pair of arms extending from both ends of said base portion such that they sandwich said movable block in its moving direction, a permanent magnet fixed between said stationary block and said yoke, and one or more coils mounted to said yoke; said movable block moving between a home position closest to one arm and a make position closest to said other arm; the width (a+s) of a first gap being smaller than the width (b−s) of a second gap at said make position, wherein a represents the width of said first gap between said movable block and said one arm at sad home position, b represents the width of said second gap between said movable block and sad other arm at said home position, and s represents the moving distance of said movable block, wherein said movable block moves between a home position closest to said one arm and a make position closest to said other arm; wherein when said coil is energized to generate a magnetic flux, the total magnetic flux is less in a first gap between said movable block and said one arm than in a second gap between said movable block and said other arm, so that said movable block is held at said make position; and wherein when said coil becomes inactive, the total magnetic flux in said first gap is more than in said second gap and causes said movable block to return to said home position under a magnetic attractive force of said permanent magnet.

8. The optical switch according to claim 7, wherein the difference (b−a−2s) between the width (a+s) of said first gap and the width (b−s) of said second gap is 0.3 mm or more at said make position.

9. The optical switch according to claim 7, wherein a setback distance δ expressed by δ=(b−s)−a is more than 0, wherein a and b respectively represent the widths of said first and second gaps at said home position, and s represents the moving distance of said movable block.

10. The optical switch according to claim 7, wherein at least one of said movable block and said stationary block is made of a soft magnetic ferrite.

11. The optical switch according to claim 10, wherein said soft magnetic ferrite is manganese-zinc ferrite.

12. The optical switch according to claim 7, wherein said coil is mounted to each arm of said yoke.

13. An optical switch for switching the connection of one or more movable optical fibers to one or more stationary optical fibers, comprising a movable soft magnetic block connected to an end portion of each movable optical fiber, a stationary soft magnetic block connected to each stationary optical fiber and fixed at a position opposing said movable block, an actuator for moving said movable block relative to said stationary block, and a means for positioning said movable block relative to said stationary block; said actuator comprising a yoke having a base portion and a pair of arms extending from both ends of said base portion such that they sandwich said movable block in its moving direction, a permanent magnet attached to said yoke, and a coil mounted to at least one arm; and said permanent magnet being positioned away from a longitudinal center line extending between said pair of arms.

wherein said movable block moves between a home position closest to said one arm and a make position closest to said other arm; wherein when said coil is energized to generate a magnetic flux, the total magnetic flux is less in a first gap between said movable block and said one arm than in a second gap between said movable block and said other arm, so that said movable block is held at said make position; and wherein when said coil becomes inactive, the total magnetic flux in said first gap is more than said second gap and causes said movable block to return to said home position under a magnetic attractive force of said permanent magnet.

14. The optical switch according to claim 13, wherein a setback distance δ expressed by δ=(b−s)−a is more than 0, wherein a and b respectively represent the widths of said first and second gaps at said home position, and s represents the moving distance of said movable block.

15. The optical switch according to claim 13, wherein at least one of said movable block and said stationary block is made of a soft magnetic ferrite.

16. The optical switch according to claim 15, wherein said soft magnetic ferrite is manganese-zinc ferrite.

17. The optical switch according to claim 13, wherein said coil is mounted to each arm of said yoke.

* * * * *